Figure 1:
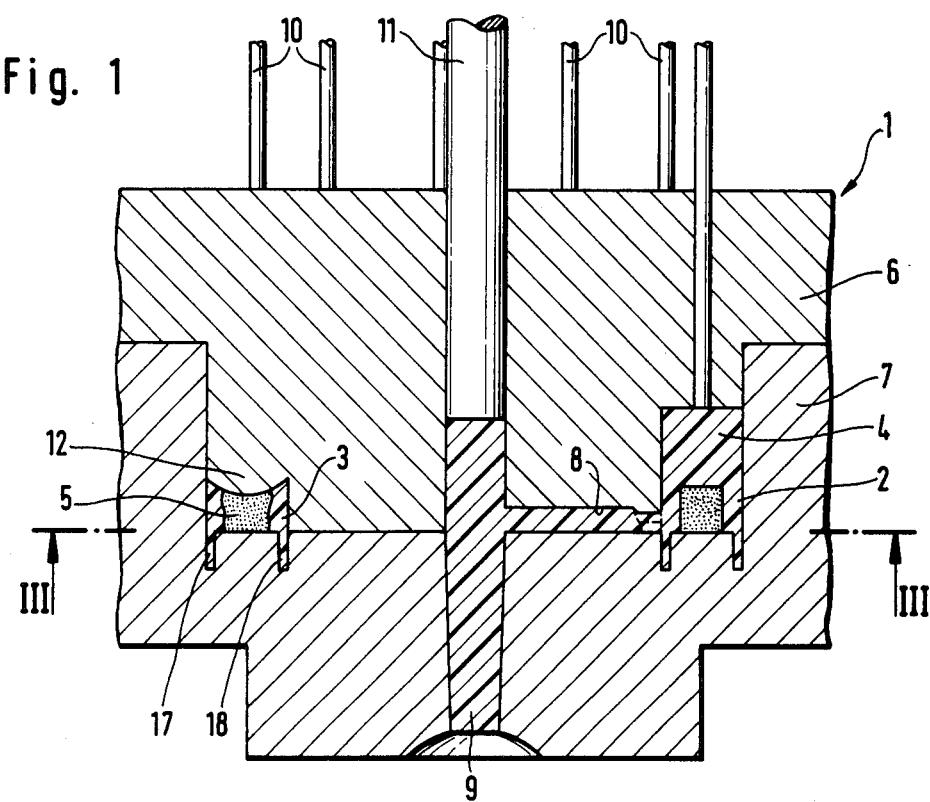

United States Patent [19]

Rabe

[11] Patent Number: 4,781,877
[45] Date of Patent: Nov. 1, 1988

[54] CAGE PRODUCTION

[75] Inventor: Jurgen Rabe, Aurachtal, Fed. Rep. of Germany

[73] Assignee: INA Walzlager Schaeffler KG, Fed. Rep. of Germany

[21] Appl. No.: 110,229

[22] Filed: Oct. 19, 1987

[30] Foreign Application Priority Data

Oct. 31, 1986 [DE] Fed. Rep. of Germany ... 363708501

[51] Int. Cl.$^4$ .......................... B29C 45/14; B32B 3/26; B21D 53/12
[52] U.S. Cl. .................................... 264/266; 264/242; 264/275; 264/130; 29/148.4 C; 29/148.4 L
[58] Field of Search ............... 264/266, 275, 242, 130, 264/DIG. 48; 29/148.4 C, 148.4 L

[56] References Cited

U.S. PATENT DOCUMENTS

| | | | |
|---|---|---|---|
| 3,807,146 | 4/1974 | Witkowski | 264/DIG. 48 X |
| 4,243,276 | 1/1981 | Persson et al. | 308/187 |
| 4,397,802 | 8/1983 | Ernst et al. | 264/267 X |

Primary Examiner—Jan H. Silbaugh
Assistant Examiner—Yun H. Wang
Attorney, Agent, or Firm—Bierman & Muserlian

[57] ABSTRACT

A method for the production of a cage made of castable or injection moldable polymeric material for rolling elements of a rolling contact bearing whereby the cage has pockets for receiving the rolling elements and contains a porous lubricant carrier, and the pockets have perforated walls to provide a direct contact between the lubricant carrier and the rolling elements. The cage is made in an injection mold or casting mold provided with cores for forming the pockets, characterized in initially inserting the lubricant carrier (5,24) into the mold (1,19), then closing the mold (1,19) whereby the lubricant carrier is elastically deformed by the cores (12,35,36) and finally surrounding the lubricant carrier (5,24) with polymeric material except at its supporting surface (14,38) and its surfaces engaging the cores (12, 35, 36).

2 Claims, 5 Drawing Sheets

CAGE PRODUCTION

STATE OF THE ART

The production of cages made of castable or injection moldable polymeric material for rolling elements of a rolling-contact bearing, which cage is provided with pockets for receiving the rolling elements and contains a porous lubricant carrier and wherein the pockets have perforated walls to provide a direct contact between the lubricant carrier and the rolling elements in an injection mold or casting mold which has cores for formation of the pockets is known. Such cages have the advantage that a sufficient lubricant supply can be stored in the lubricant carrier over the life of the rolling-contact bearing and lubricant can continuously be delivered therefrom to the rolling elements during operation.

A method of this kind is known from DE-PS No. 2,840,413 wherein the cage is made of a so-called integrated foamed plastic material to act as a porous core and a closed homogenous surface upon being removed from the mold. Thence, the walls have to be perforated in separate process steps to permit contact between the rolling elements and the porous core of the cage acting as the lubricant carrier. Moreover, certain minimum cross sections are required to ensure the formation of a porous core so that the known method allows only the making of cages of comparably wide dimensions.

OBJECTS OF THE INVENTION

It is an object of the invention to provide a production method in which no further process steps for making the perforated walls are necessary after casting or injection molding of the cage and which is also suitable for cages of small dimensions.

This and other objects and advantages of the invention will become obvious from the following detailed description.

THE INVENTION

The novel method of the invention for the production of a cage made of castable or injection moldable polymeric material for rolling elements of a rolling contact bearing, said cage having pockets for receiving the rolling elements and containing a porous lubricant carrier, the pockets having perforated walls to provide a direct contact between the lubricant carrier and the rolling elements and the cage is made in an injection mold or casting mold provided with cores for forming the pockets, characterized in initially inserting the lubricant carrier (5,24) into the mold (1,19), then closing the mold (1,19) whereby the lubricant carrier is elastically deformed by the cores (12,34) and finally surrounding the lubricant carrier (5,24) with the polymeric material except at its supporting surface (14,38) and its core engaging surface (12,34).

Since the lubricant carrier is elastically deformed by the cores during closing of the mold, pressure forces are acting between these parts to prevent a penetration of the polymeric material between the cores and the surfaces of the lubricant carrier engaging the cores so that the cage made by the method of the invention has pockets already provided with perforated walls which are required for the contact of the rolling elements with the lubricant carrer when removed from the mold.

During the production of the cage, the lubricant carrier is subjected to elastic deformation by the cores which deformation gradually recedesin the finished cage due to the relaxation behavior of the material of the lubricant carrier and the lubricant carrier slightly projects in the finished cage into the pockets in the area of the perforated walls of the pockets. Thus, a permanent contact is guaranteed between the rolling elements and the lubricant carrier.

Insertion of the lubricant carrier into the mold is possible by making the latter as a separate element and then inserting it in the mold. It is also possible within the scope of the invention to use a mold having a variable mold cavity which in one case corresponds to the shape of the lubricant carrier and in the other case to the cage. Then, in a first working step, the lubricant carrier is initially produced in a single mold and after enlarging the mold cavity and deformation of the lubricant carrier by the cores, the lubricant carrier can be surrounded with polymeric material in the described manner.

In a modification of the invention, the cage is afterwards closed at the boundary surface defined by the contact surface of the lubricant carrier to prevent the lubricant from escaping. This may be achieved e.g. by connecting a ring of polymeric material with the ring element of the cage in materially-linking or form-fitting manner.

REFERRING NOW TO THE DRAWINGS

Figure 3:
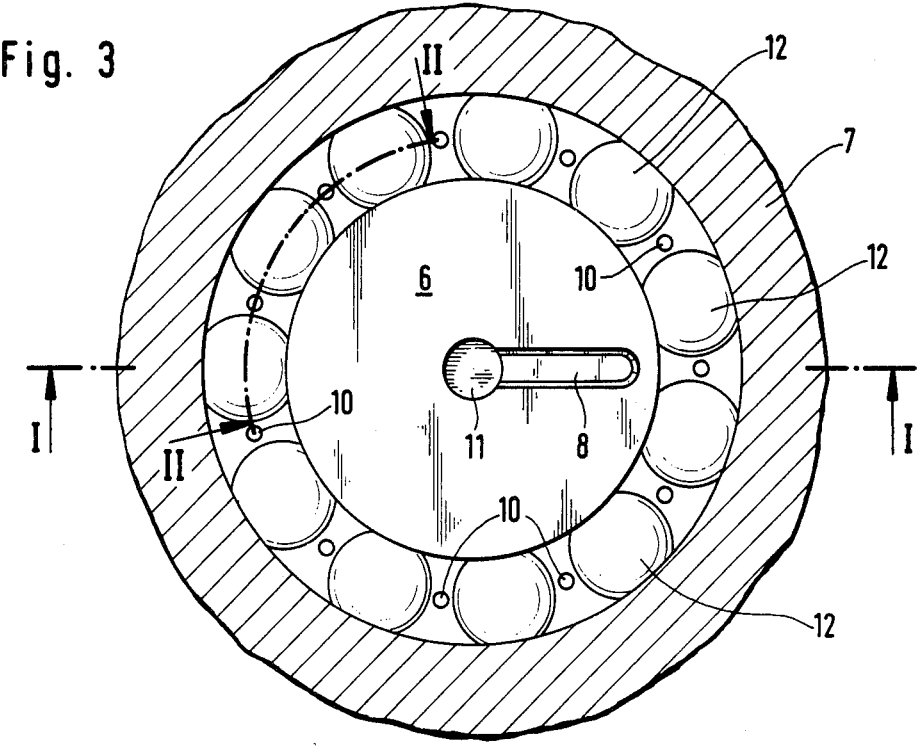
Figure 2:
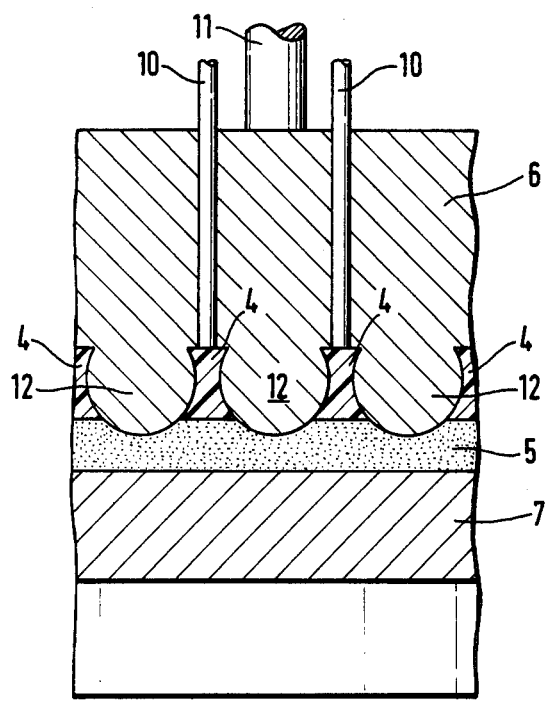
Figure 5:
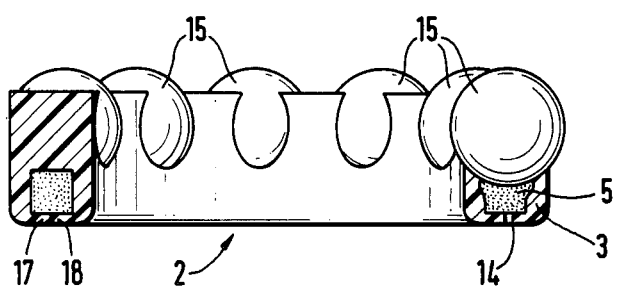
Figure 4:
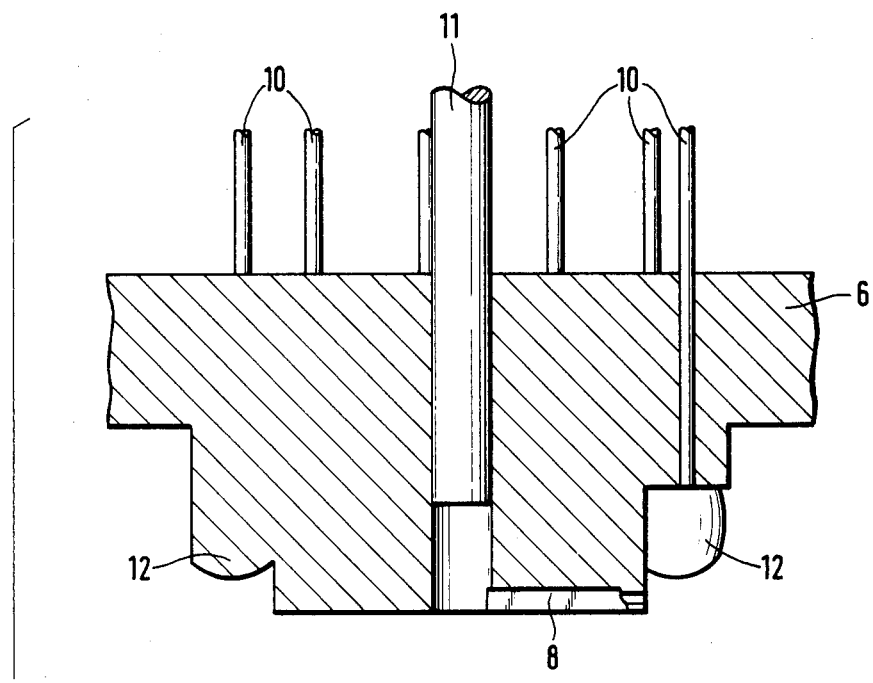
Figure 4:
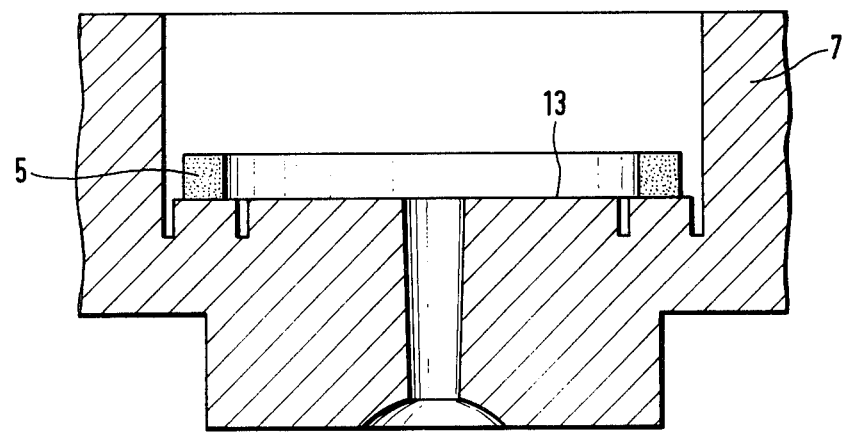

FIG. 1 is a longitudinal cross section through an injection mold taken along the line I—I of FIG. 3, FIG. 2 is a partial cross section view in closed position taken along the line II—II in FIG. 3, FIG. 3 is a cross sectional view taken along the line III—III of FIG. 1, FIG. 4 is a longitudinal cross section through the open injection mold, FIG. 5 is a longitudinal cross section through a comb cage produced by the method of the invention.

Figure 6:
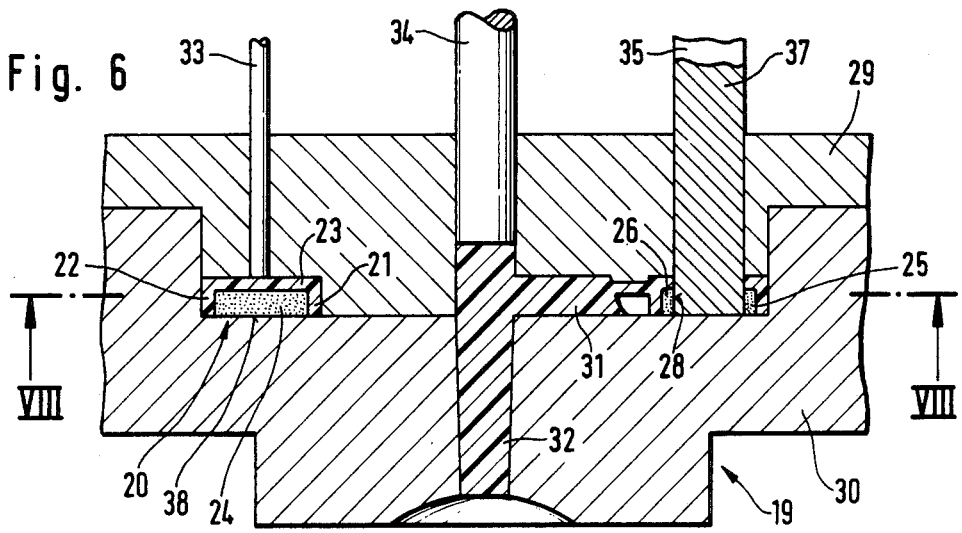
Figure 7:
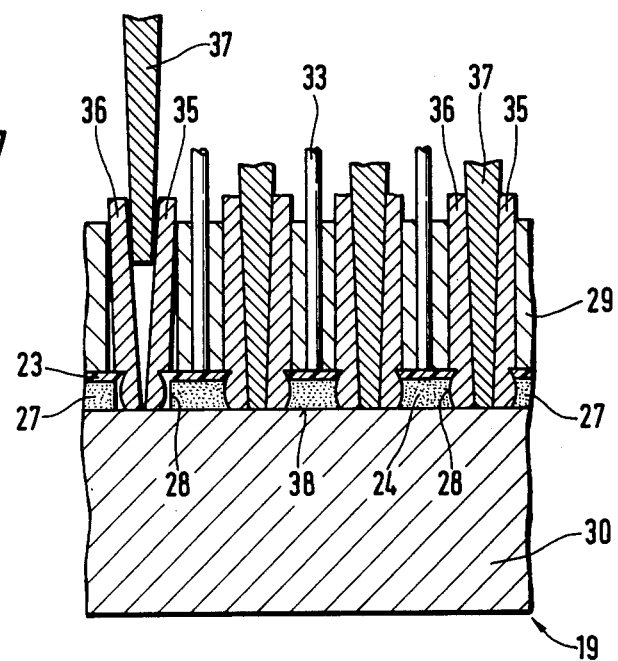
Figure 9:
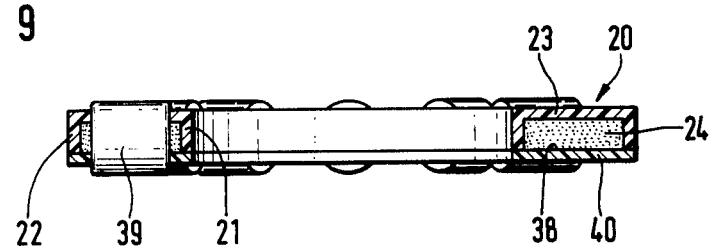
Figure 10:
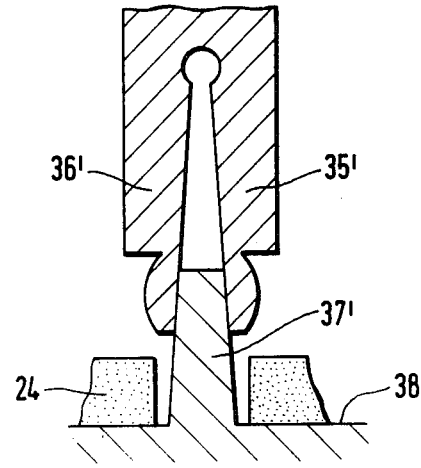
Figure 8:
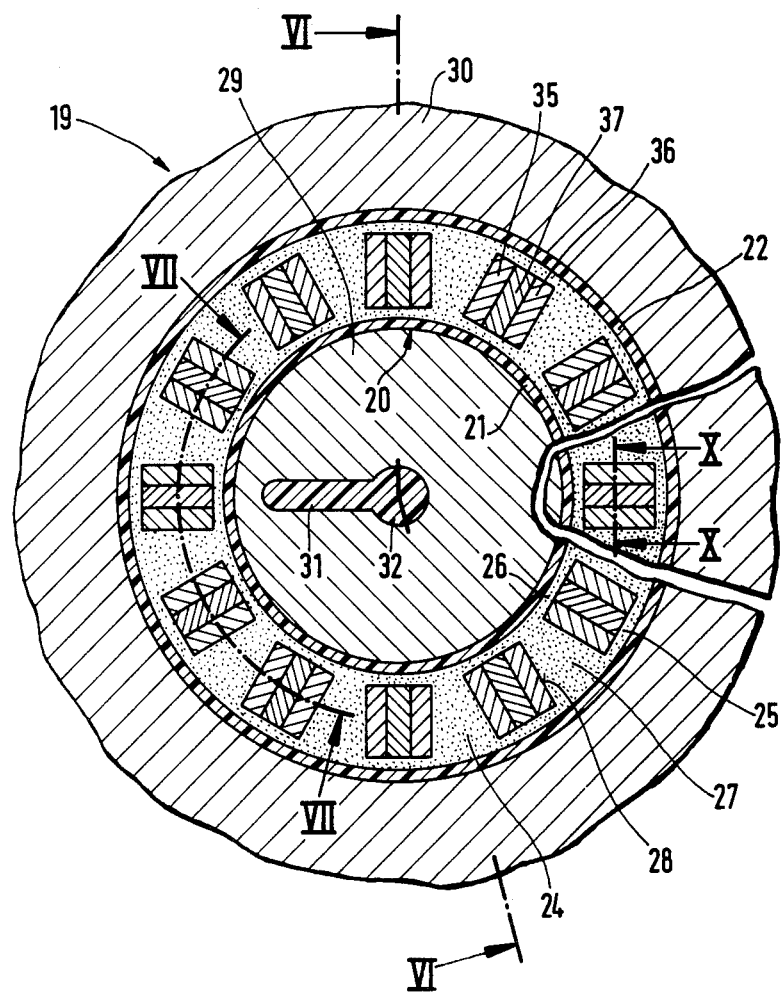

FIG. 6 is a longitudinal cross section through an injection mold taken along the line VI—VI of FIG. 8, FIG. 7 is a cross sectional view in closed position taken along the line VII—VII of FIG. 8, FIG. 8 is a cross sectional view taken along the line VIII—VIII of FIG. 6 and FIG. 9 is a longitudinal cross section through a thrust cage produced by the method of the invention, FIG. 10 is a cross sectional view in closed position taken along the line X—X of FIG. 8.

FIGS. 1 to 3 show an injection mold 1 containing a finally injection molded comb cage 2 for a radial bearing which is called in the following description a cage and is not shown in FIG. 3 for ease of illustration. The cage 2 comprises an end ring 3 and crossbars 4 integrally connected to the latter at an uniform distance to define pockets with spherical walls for receiving balls. The cage 2 contains in its end ring 3, an annular porous lubricant carrier 5 and the walls of the pockets are perforated so that the lubricant carrier 5 defines a portion of the surface of the walls of the pockets.

The injection mold 1 includes two axially separable mold halves 6 and 7 which enclose a cavity corresponding to the shape of the cage 2 which is connected via a runner 8 to the sprue 9. A plurality of axially displacable ejectors 10 are provided for the finished cage 2 in the mold half 6 and engage the end faces of the crossbars 4. Moreover, a further axially displacable ejector 11 is arranged for the sprue 9 at a central location in the mold half 6. Finally, the mold half 6 is provided with a plurality of projecting cores 12 which mold the pockets and are of spherical contour.

The manufacture of the cage proceeds so that initially, as shown in FIG. 4, the lubricant carrier 5 is disposed centrally on te base 13 of the mold half 7 in the open mold 1. The mold 1 is then closed thereby shaping the lubricant carrier 5 by the cores 12 in the manner illustrated in FIGS. 1 and 2 since their distance from the base 13 of the mold half 7 in closed mold 1 is smaller than the axial extension of the lubricant carrier 5. Finally, the remaining mold cavity is filled with polymeric material for forming the actual cage 2.

Thus, the lubricant carrier 5 is completely surrounded by the polymeric material except at its contact surface 14 bearing against the base 13 and its surfaces engaging the cores 12. At these previously mentioned surfaces, the lubricant carrier 5 is not covered with polymeric material because the elastic deformation occurring during closure of the mold 1 causes pressure forces acting between these surfaces and the respective surfaces of the mold 1 which prevent a penetration of polymeric material between the lubricant carrier 5 and the mold 1.

FIG. 5 shows the cage 2 made by the method of the invention with balls 15 inserted in its pockets. To prevent lubricant from escaping, the cage 2 is closed on its back side so that the tubular projections 17 and 18 which are integrally connected to the inner diameter and outer diameter of the end ring 3 and, as is shown in FIG. 1, initially extend in the axial direction are folded radially inwardly and radially outwardly, respectively. This may be done in an economical manner especially by application of heat.

FIGS. 6 to 8 show an injection mold 19 which contains a finally injection molded thrust roller cage 20 which is referred to as the cage for brevity in the following description. Cage 20 includes two concentric end rings 21 and 22 which are connected by crossbars 23 for defining cage pockets for rollers. The cage 20 contains a porous lubricant carrier 24 which, like cage 20, includes two annular end rings 25 and 26 connected by crossbar sections 27 which narrow in a wedge-shaped manner so as to define windows 28, the length of which corresponds to that of the rollers and the width of which is smaller than the diameter of the rollers.

The injection mold 19 includes two axially separable mold halves 29 and 30 which enclose a cavity corresponding to the shape of the cage 20 and are connected via the runner 31 to the sprue 32. Provided in the mold half 29 are ejectors 33 for the cage 20 and one ejector 34 for the sprue 32. Moreover, three cores 35, 36 and 37 are arranged in the mold half 29 to define the cage pockets. For ease of illustration, FIG. 6 illustrates only the ejector 33 respectively arranged in the section plane and the core opposing this ejector 33 and comprising the three cores 35, 36 and 37.

In contrast to the initially described embodiment in which the one mold half is provided with fixed cores and the cage is ejected from the mold under elastic deformation, the cores 35, 36 and 37 of the injection mold 19 are designed as subdivided cores which means that each core includes two outer core elements 35 and 36 with an outer contour corresponding to that of the walls of the cage pockets and a central wedge-shaped core element 37.

On the right hand side of FIG. 7, the cores 35, 36 and 37 are illustrated in active position which means that the central core element 37 is completely inserted between the outer core elements 35 and 36 so that the shape of the cores 35, 36 and 37 correspond to that of the cage pockets. In contrast thereto, the left hand side of FIG. 7 illustrates one core 35, 36 and 37 in its inactive position which means that the center core element 37 is removed from the outer core elements 35 and 36 to such a degree that the latter can occupy a position in which the cage 20 can be ejected from the mold 19 without being subjected to deformations. In addition, the windows 28 of the lubricant carrier 24 are dimensioned so that the cores 35, 36 and 37 can engage therein when in the inactive position without deforming the lubricant carrier 24.

The cage 20 is made so that the lubricant carrier 24 is initially inserted in the mold half 30 and the mold 19 is then closed while the cores 35, 36 and 37 are in their inactive position and thus engage the windows 28 of the lubricant carrier 24 (see left hand side of FIG. 7). Then, the closing step of the mold 19 is concluded by bringing the cores 35, 36 and 37 into their active position whereby the lubricant carrier 24 in vie of the fact that the width of its windows 28 is smaller than the diameter of the rollers is elastically deformed by the cores 35, 36 and 37 (see right hand side of FIG. 7) in the area of its crossbar sections 27. Finally, the remaining mold cavity is filled with polymeric material for formation of the actual cage 20.

Thus, the lubricant carrier is surrounded completely with polymeric material except at the contact surface 38 bearing against the mold half 29 and its surfaces engaging the cores 35, 36 and 37. Since the lubricant carrier 24 is elastically deformed during activation of the cores 35, 36 and 37 along its crossbar sections 27 which narrow in a wedge-shaped manner, pressure forces are effective which reliably prevent polymeric material from penetrating into this area between the lubricant carrier 24 is guaranteed in the finished cage 20 in the area of the sections 27 of the lubricant carrier 24.

FIG. 9 shows a cage 20 which is made by the previously described method of the invention and rollers 39 are inserted in the cage pockets. To prevent the lubricant from escaping, cage 20 is closed at its end face defined by the contact surface of the lubricant carrier 24 by an annular disk 40 which is securely connected with both end rings 21 and 22 of the cage 20.

FIG. 10 illustrates a further possible embodiment of the invention which is a cross sectional view taken along the line X—X of the segment cut out in FIG. 8. Instead of operating the three cores 35, 36 and 37, as described in the previous example, which are arranged in the upper mold half 29 and provided for formation of the cage pockets in the same direction, in this embodiment of the invention, the cores 35', 36' are arranged in the upper mold half and operate in opposite direction to the core 37' which is arranged in the lower mold half In this context, the two outer core elements 35' and 36' have an outer countour corresponding to the wall surface of the cage pockets and their interior is defined by a slot narrowing in a wedge-shaped manner. At the narowest point of this slot, both core elements 35' and 36' are unified to one single core. The core element 37' arranged in the lower mold half is fixedly connected to the contact surface 38 and defines centrally under the wedge-shaped slot defined by the core elements 35' and 36' a flattened wedge in accordance with this slot.

The operation of the core elements 35', 36' and 37' is such that in the illustrated active position, the core elements 35' and 36' are arranged in the upper mold half shift from the top to the bottom with their inner bevelled surfaces which narrow in a wedge-shaped manner over the stationary bevelled surfaces of the core element 37'. When the flattened ends of the core elements 35 and 36' abut against the contact surface 38 of the lower mold half, the outer contours of the core elements 35' and 36' expand to a degree corresponding to the cage pockets. Thus, the mold cavity is prepared in a relatively simple manner for formation of the cage of polymeric material.

It is within the scope of the invention to design the cores for forming the pockets in a different manner than that shown in the exemplified embodiments, especially if other cage structures are concerned as long as the deformation of the lubricant carrier is guaranteed to such a degree that its surfaces contacting the cores are not surrounded with polymeric material. In case this should be necessary, then a cage made by the method of the invention may be provided with bores in its wall adjacent to the raceways of the rolling-contact bearing through which bore superfluous lubricant present in the area of the raceways are conveyed back by capillary action into the lubricant carrier.

Various other modifications of the method of the invention may be made without departing from the spirit or scope thereof and it should be understood that the invention is intended to be limited only as defined in the appended claims.

What is claimed is:

1. A method for the production of a cage made of castable or injection moldable polymeric material for rolling elements of a rolling contact bearing, said cage having pockets for receiving the rolling elements and containing a porous lubricant carrier, the pockets having perforated walls to provide a direct contact between the porous lubricant carrier and the rolling elements and the cage being made in an injection mold or casting mold provided with cores for forming the pockets, comprising initially inserting the porous lubricant carrier (5,24) into the mold (1,19), then closing the mold (1,19) whereby the porous lubricant carrier is elastically deformed by the cores (12,35,36), then casting or injection molding the polymeric material into the mold to fill the mold, thereby surrounding the porous lubricant carrier (5,24) with the polymeric material except at its supporting surface (14,38) and its surfaces engaging the cores (12,35,36), and removing the cage from the mold, whereby deformation of the porous lubricant carrier recedes and the porous lubricant carrier slightly projects into said pockets.

2. The method of claim 1 wherein the cage (2,20) is closed at its periphery defined by the supporting surface (14,38) of the lubricant carrier (5,24).

* * * * *